US008907766B2

(12) United States Patent
Korgaonkar et al.

(10) Patent No.: US 8,907,766 B2
(45) Date of Patent: Dec. 9, 2014

(54) METHOD AND SYSTEM FOR SECURE COMMUNICATION

(75) Inventors: Vivekanand Korgaonkar, Ipswich (GB); Ben Strulo, Felixstowe (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1289 days.

(21) Appl. No.: 12/084,828

(22) PCT Filed: Oct. 26, 2006

(86) PCT No.: PCT/GB2006/003995
§ 371 (c)(1), (2), (4) Date: May 12, 2008

(87) PCT Pub. No.: WO2007/054665
PCT Pub. Date: May 18, 2007

(65) Prior Publication Data

US 2010/0033305 A1 Feb. 11, 2010

(30) Foreign Application Priority Data

Nov. 11, 2005 (EP) .................................... 05256974

(51) Int. Cl.
*H04Q 5/22* (2006.01)
*H04B 15/00* (2006.01)
*H04K 3/00* (2006.01)

(52) U.S. Cl.
CPC .. *H04K 3/86* (2013.01); *H04K 3/28* (2013.01); *H04K 3/825* (2013.01); *H04K 3/45* (2013.01); *H04K 2203/20* (2013.01)
USPC ............................ 340/10.1; 455/501; 380/44

(58) Field of Classification Search
CPC ................................ H04K 3/28; H04K 3/825
USPC ............ 380/281, 284; 455/63.1, 63.3, 67.14, 455/69; 726/14, 1-4
See application file for complete search history.

(56) References Cited

U.S. PATENT DOCUMENTS 5,414,728 A * 5/1995 Zehavi .......................... 375/142
6,028,853 A * 2/2000 Haartsen ....................... 370/338
(Continued)

FOREIGN PATENT DOCUMENTS

EP 1 303 069 4/2003
FR 2 875 976 3/2006
(Continued)

OTHER PUBLICATIONS

Rivest, R. L. et al., "Chaffing and Winnowing: Confidentiality without Encryption", CryptoBytes, vol. 4, No. 1, pp. 12-17, (1998).

(Continued)

*Primary Examiner* — Steven Lim
*Assistant Examiner* — Omeed Alizada
(74) *Attorney, Agent, or Firm* — Nixon & Vanderhye P.C.

(57) ABSTRACT

A communications system including a receiver and a first transmitter, wherein the first transmitter transmits noise signals across a range of communication channels used by the receiver, the receiver being adapted to receive a transmission transmitted by a second transmitter over one or more of said range of communication channels, and to distinguish the transmission made by the second transmitter from the noise signals using information from the first transmitter about the noise signals.

25 Claims, 7 Drawing Sheets

(56) References Cited

U.S. PATENT DOCUMENTS

| | | | | |
|---|---|---|---|---|
| 6,473,412 | B1 * | 10/2002 | Haartsen | 370/331 |
| 6,539,204 | B1 * | 3/2003 | Marsh et al. | 455/63.1 |
| 8,130,862 | B2 * | 3/2012 | Forenza et al. | 375/295 |
| 2003/0185176 | A1 * | 10/2003 | Lusky et al. | 370/335 |
| 2003/0197612 | A1 * | 10/2003 | Tanaka et al. | 340/572.1 |
| 2005/0058292 | A1 | 3/2005 | Diorio et al. | |

FOREIGN PATENT DOCUMENTS

| | | |
|---|---|---|
| JP | 2007-532939 | 11/2007 |
| JP | 2008-515261 | 5/2008 |

OTHER PUBLICATIONS

Juels, A. et al. "RFID Security and Privacy: A Research Survey", [Online], pp. 1-19, (Sep. 28, 2005).

International Search Report for PCT/GB2006/003995, mailed Jan. 16, 2007.

Office Action (2 pgs.) dated Mar. 7, 2012 issued in corresponding Japanese Application No. 2008-539483 with an at least partial English-language translation thereof (2 pgs.).

Office Action (5 pgs.) dated Apr. 26, 2013 issued in corresponding Korean Application No. 2008-7012218 with an at least partial English-language translation thereof (3 pgs.).

* cited by examiner

Figure 4

- RFID tag output

1010111000110101

- RFID tag output would be interleaved with output generated by the Noise Generator tag

- Overall output might look like below

1100110101111010001011110110100

1 – Noise Generator device B output
1 – Device A output

METHOD AND SYSTEM FOR SECURE COMMUNICATION

This application is the U.S. national phase of International Application No. PCT/GB2006/003995, filed 26 Oct. 2006, which designated the U.S. and claims priority to European Application No. 05256974.6, filed 11 Nov. 2005, the entire contents of each of which are hereby incorporated by reference.

BACKGROUND AND SUMMARY

The present invention relates to a method and system for communication, and particularly, but not exclusively, to a method and system for providing secure communication without use of encryption.

In the communication field, it has long been accepted that there are two principal ways in which a message can be securely communicated between two parties: encryption and steganography.

Encryption generally involves replacing the "plain text" of the original message with a code which can (hopefully) only be decoded by the intended recipient. Current encryption technologies such as DES and RSA generally use either exchanged keys or a public/private key system.

Steganography involves "hiding" the plain text of the original message in another item that is communicated between the parties. This approach includes methods such as placing the plain text at agreed locations within a "cover" message, or communicating the plain text as part of the pixels of a picture. In all cases, the plain text of the original message is still present in its original, unencoded form, but only the intended recipient knows how to retrieve it from the "cover".

Recently, a third method of secure communication has been suggested, principally in Chaffing and Winnowing: Confidentiality without Encryption by Ronald L. Rivest, CryptoBytes (RSA Laboratories), volume 4, number 1 (summer 1998), 12-17. This technique is called "chaffing", as the principle is to provide sufficient "chaff" that only the intended recipient can sort out the "wheat" of the original message. Chaffing is similar in many respects to steganography, in that the original message is communicated between the parties without encryption, but only the intended recipient is able to retrieve the original message.

There is increasingly a demand for secure communication in all fields. This demand creates problems in fields where the devices used to transmit messages are relatively simple and need to be low cost, such as radio-frequency identifiers (RFIDs). Such devices are generally incapable of performing the complex routines required to encrypt their messages or of constructing and transmitting the cover message required for steganography.

The chaffing method described in Rivest above still requires the two communicating parties to have exchanged information in advance in order for the receiver to be able to distinguish the authentic Message Authentication Codes (MACs).

Accordingly, at its broadest, the present invention provides a communications system in which noise is transmitted over a range of communication channels, and the receiver is able to distinguish an original message by using information about that noise. A receiver which does not have information about that noise is not able to distinguish the original message.

A first aspect of the present invention provides a communications system including a receiver and a first transmitter, wherein:

the first transmitter transmits noise signals across a range of communication channels used by the receiver;

the receiver is adapted to receive a transmission transmitted by a second transmitter over one or more of said range of communication channels, and to distinguish the transmission made by the second transmitter from the noise signals using information from the first transmitter about the noise signals.

By using the above system, the second transmitter does not need to have any capability to encrypt or disguise its transmissions in order to securely transmit them to the receiver, as the security for those transmissions is provided by the noise transmissions from the first transmitter. Accordingly, the second transmitter can be made relatively simple and cheap to construct.

The information about the noise signals is preferably communicated from the first transmitter to the receiver. The information may be the complete content of the noise signals, which may contain a time stamp so that the signals can be compared to the received signals.

Alternatively or additionally, the information may be which channels the noise was transmitted over at particular times.

In a particular embodiment of the first aspect, the receiver and first transmitter are part of the same device. In this embodiment, the communication of the information about the noise signals may be achieved by the first transmitter having an internal output by which the noise is passed to the receiver, or by the receiver and the transmitter sharing a common memory or processor. In one specific embodiment, the first transmitter may receive driver signals from a processor, and the same driver signals may be provided to the receiver by the same processor.

The term "noise signals" is used to describe any signals which are not part of the transmissions from the second transmitter. Such signals need not be "noise" in the meaning of an entirely random signal, and preferably the noise signals are such that they are readily separable by the receiver from the transmissions from the second transmitter, e.g. by virtue of the channels over which they are transmitted.

Indeed, the content of the noise signals is preferably substantially identical to the transmissions made by the second transmitter. If this is the case, may be even more difficult for a third party or interloper to distinguish the transmissions from the second transmitter simply by analysing the content of the transmissions.

The range of communication channels may include one or more of: different time slots; different frequency bands; different orthogonal codes. The communications channels may also be Ethernet-type channels in which there are no defined slot and the transmitters wait for the medium to be idle before transmitting asynchronously.

A further aspect of the present invention provides a communications system according to the above first aspect, further including said second transmitter, the second transmitter transmitting over one or more of said communication channels.

In this aspect there may be a plurality of said second transmitters.

The or each second transmitter may be a simple device. Simple devices, sometimes known as "dumb" devices or tags, are limited in one or more of their computational power, their battery power or life, or their memory capabilities, and so are not capable of performing techniques such as encryption, which are expensive to perform in terms of those factors. For example the simple device may be one which simply transmits its own ID over a pre-selected communication channel, or one which can read only one frequency and one protocol. Thus it is unable to filter reads, store tag data and so on.

Although the present invention also covers second transmitters which are more complex, and indeed transmitters that may have considerable processing power, in this aspect of the present invention, that processing power is not required to disguise or encrypt the transmissions for security due to the noise transmission of the first transmitter.

In one typical example, the or each second transmitter is an RFID tag, and the receiver is an RFID reader or overseer tag.

Preferably, the receiver, the second transmitter or both are adapted to detect when a collision occurs on a particular channel, and cause the data lost in that collision to be retransmitted. If the system has this ability, then the first transmitter can transmit over all the possible communications channels without having to know what channels are being used by the second transmitter(s), as any collisions will be detected and the data lost retransmitted.

In the present description, references to "collision" are to situations where more than one demand is made simultaneously on the medium that is being used to communicate between the devices. The definition of this term at www.wikipedia.org reads: "In a data transmission system, the situation that occurs when two or more demands are made simultaneously on equipment that can handle only one at any given instant."

"Collision" is a standard term of art in the description of Media Access Control (MAC) protocols. The MAC for Ethernet and for wireless systems is fundamentally based on avoiding and/or detecting and correcting collisions, and collision in this sense often appears in the name of such protocols, for example, CSMA/CA refers to Carrier Sense Multiple Access/Collision Avoidance.

A further aspect of the present invention provides a method of securing communications between a first transmitter and a receiver, the method including the steps of:

transmitting a message from the first transmitter over one or more of a range of communication channels;

transmitting noise from a second transmitter over said range of communications channels; passing to the receiver information about the noise from the second transmitter; retrieving, from the transmissions over said range of communications channels, the transmitted message using the information from the second transmitter.

The step of retrieving may include receiving a combination of the transmitted message and the transmitted noise in the receiver, and separating the transmitted message from that combination using said information.

Alternatively, or additionally, the step of retrieving may include selectively receiving on only a portion of said range of communications channels, so as to only receive the message, said portion being determined using said information.

In one embodiment of the method of this aspect, the second transmitter and the receiver are part of the same device.

Preferably, the content of the noise signals is substantially identical to the transmissions made by the, or each first transmitter. The advantages of this feature have been explained in relation to the first aspect above.

The range of communication channels may include one or more of: different time slots; different frequency bands; different orthogonal codes.

Preferably, the method further includes the step of detecting when a collision occurs between a part of the message transmitted by the first receiver and the noise transmitted by the second receiver, and retransmitting the part of the message affected.

The method of the present aspect may be implemented in a system of either of the first two aspects, including any combination of the optional or preferred features of those aspects.

BRIEF DESCRIPTION OF THE DRAWINGS

Embodiments of the present invention will now be described in relation to the accompanying Figures, in which:

FIG. 4 is a diagram illustrating the principle underlying embodiments of the present invention;

DETAILED DESCRIPTION OF PRESENT EXAMPLE EMBODIMENTS

Figure 1:
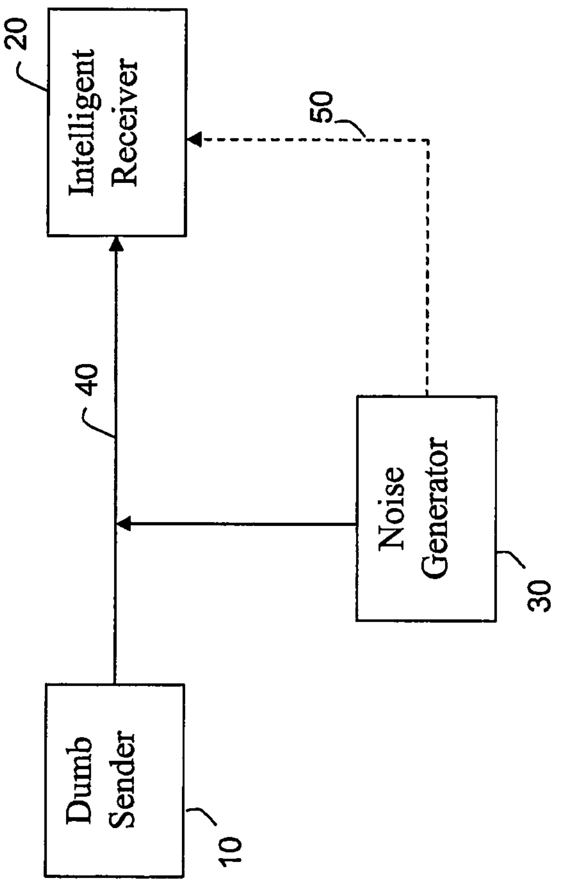
FIG. 1 is a schematic diagram of a first embodiment of the present invention.

FIG. 1 shows a first embodiment of the present invention in schematic form. A dumb sender 10 transmits over a pre-selected communication channel from a range of such channels 40. Simultaneously, a noise transmitter 30 transmits noise signals over the range of communication channels 40 including the pre-selected communication channel. The noise transmitter 30 passes data regarding the noise it is transmitting or has transmitted over a secure communications link 50 to the intelligent receiver 20.

The intelligent receiver 20 receives all the data transmitted over the range of communication channels 40, including that sent over the pre-selected communication channel by the dumb sender 10. The receiver 20 uses the data received over the secure communications link 50 from the noise transmitter 30 to distinguish the data that was sent by the dumb sender 10.

In an alternative configuration, the receiver 20 does not receive all of the data transmitted over the entire range of communications channels 40, but selectively receives the data transmitted on certain of those communications channels 40, according to the data regarding the noise.

A third party, or interloper, hears all of the data transmitted over the range of communications channels 40, and without any information as to what parts of the data are noise produced by the noise transmitter 30, cannot distinguish the data sent by the dumb sender 10.

Figure 2:
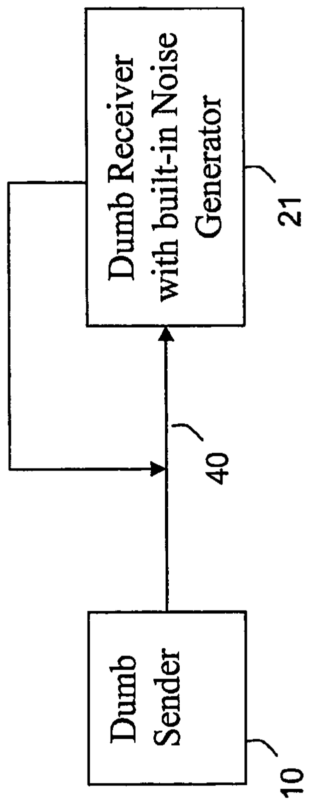
FIG. 2 is a schematic diagram of a second embodiment of the present invention.

FIG. 2 shows an alternative embodiment of the present invention, in which the noise transmitter is incorporated into the receiver 21. Here the data regarding the noise does not need to be passed over a secure communications channel, as it can be passed internally within the receiver 21. Otherwise, the system operates as discussed in relation to FIG. 1 above, including the possible alternative arrangement in which the receiver selectively receives data from the communications channels 40 depending on the information regarding the noise.

In one possible arrangement, a processor provides a driver signal to the noise transmitter incorporated into the receiver 21, which determines which channels the noise transmitter will transmit over, and the same driver signal is supplied to the receiver portion which uses that information to receive the message.

Figure 3:
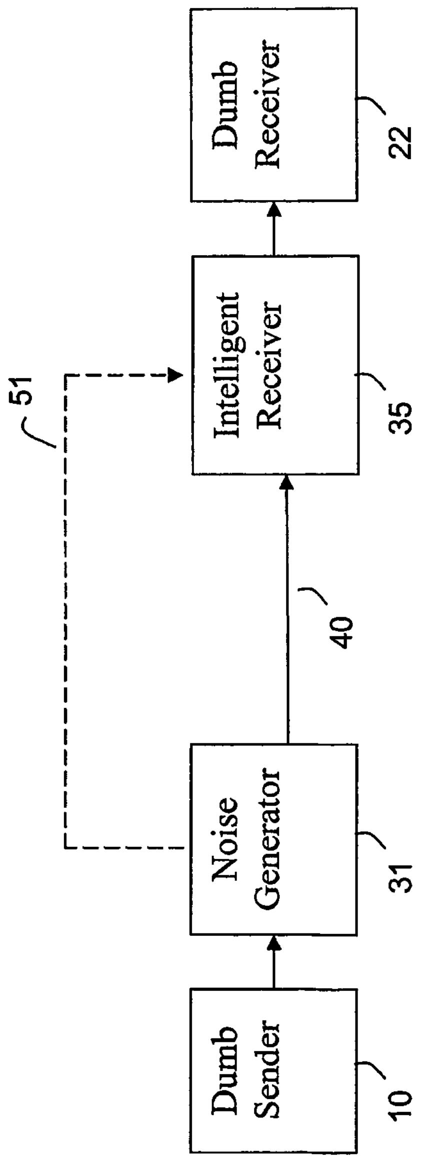
FIG. 3 is a schematic diagram of a third embodiment of the present invention.

FIG. 3 shows a further embodiment of the present invention, in which a specific noise transmitter 31 acts on a message received from the dumb sender 10, transmitting both the message and noise over the range of communications channels 40. The noise transmitter 31 also transmits over a dedicated communication channel 51 information regarding the noise. The intelligent receiver 35 receives all the signals transmitted over the range of communications channels, as well as the information regarding the noise transmitted over the dedicated communication channel 51, and using that information determines the content of the message, which is passed to a dumb receiver 22 for processing. Again, the intelligent receiver 35 may use the information regarding the noise to selectively receive data from the range of communications channels 40 as described above.

In an alternative arrangement of the embodiment of FIG. 3, a pre-arranged sequence of channels could be used for the noise, that pre-arranged sequence being known between the noise transmitter 31 and the intelligent receiver 35. In this case, information about the noise need not be passed over channel 51, although this channel could be used to transmit the initial pre-arranged sequence, or alterations to that sequence.

Some examples of the communications channels that may be used in the present invention are set out below.

Time: the devices communicate over many different time slots. Given that a message needs to be sent, the message is broken into many bits (or larger chunks, e.g. bytes, 16 bit words, or any predetermined number of bits). The communication channels are time slots and the senders send the message bits at randomly chosen time slots. As other devices (particularly the noise transmitter) are sending in different time slots, the data gets interleaved with data from other devices, thereby making it indistinguishable. The noise transmitters could send the information regarding the noise signals to any party interested in the information after that party has been authenticated.

Frequency: the devices communicate over many different frequencies. Again, the message is broken into many bits (or combinations of bits), and in this case sent over randomly chosen frequency channels. The noise transmitters essentially do the same. Consequently, the receiver receives information over many different frequencies and extracts the information based on information about the frequencies used by the noise transmitters.

Orthogonal Codes: the devices communicate over different orthogonal codes. Again, the message is broken into many bits (or combinations of bits) and in this case sent encoded with randomly chosen orthogonal codes and transmitted across the channel. The noise transmitters do the same with noise data. The receiver extracts the information using information sent by the noise transmitters.

In one specific embodiment of the present invention, the system and method are used in relation to RFID tags.

At its simplest, the arrangement considers two transmitting devices, A and B. The information transmitted by each device is typically a stream of bits of ones and zeros, e.g. as shown in FIG. 4. During the communication both devices are aware of the communications and collisions that take place and hence can identify each other's bits (see final bit stream in FIG. 4). But an eavesdropper cannot tell which bit is from which device. Thus, if only two devices A and B are transmitting, then they will learn each other's output. They can also learn a shared secret, which can be constructed, for example, from either parties output, or the outputs XOR'ed together, or from the offsets of each other's data or other functions of this combined stream.

However, a third party or interloper device C could receive the data above and would be unable to learn either output or the shared secret.

However, if it was desired to introduce a new device to the secured network, the noise transmitting device B could perform an authentication step with C. Then, if B is satisfied with C's credentials, it could inform C of the necessary information to allow it to understand A's output. In this way, B is performing an authentication on behalf of A which may be such a simple device that it cannot do it on its own.

One example system is one in which RFID tags transmit product-identifying information upon being queried by the RFID readers. The privacy or security concern in RFID exists mostly in the wireless link between the RFID tag and RFID reader since this is generally unencrypted and thus vulnerable to both spoofing and eavesdropping. In accordance with the embodiment of the present invention, known noise is added to the data when the RFID tag is transmitting information to the RFID reader.

There are several scenarios that are possible, two examples of which are:

a. Trusted RFID readers secure, by transmitting noise signals, the information sent by the RFID tags, which prevents un-trusted readers from eavesdropping on the information. This scenario is potentially useful in corporate scenarios to prevent espionage.

b. Special noise generator tags could add noise signals to the information transmitted by the tag—RFID tags could still be low cost and the RFID readers would not need to be modified. The noise generator tags are carried by an individual to add noise signals to the information transmitted by the individual's tags.

The reader-tag communication protocol would be same for both the scenarios. The tag uses random access anti-collision protocols similar to slotted ALOHA to prevent contention. Slotted ALOHA is a synchronous protocol in which time is divided into slots that any device can use to transmit. Each device chooses a slot randomly, but do not check whether a slot is free before transmitting. If only one device transmits the data is sent, but if two (or more) devices transmit in the same slot, all the data is lost. Both devices then retransmit but randomly re-select their slots to make it less likely than another collision will occur.

Consider a single tag that generates information upon being queried by the reader. The information generated would be something like bits of ones and zeros, e.g. as shown in FIG. 4 and referred to above. The reader would receive the composite data. If the noise generator tag was being used to disguise the message then the reader would authenticate itself to the noise generator tag before the noise generator tag sends the information regarding the noise signals in the message.

The noise generator tag is a device in close range of the RFID tags so that it could insert noise bits when the tag is transmitting data to the reader. The noise generator tag is essentially adding extraneous data to the channel making it difficult for an adversary to read tag information.

Figure 5:
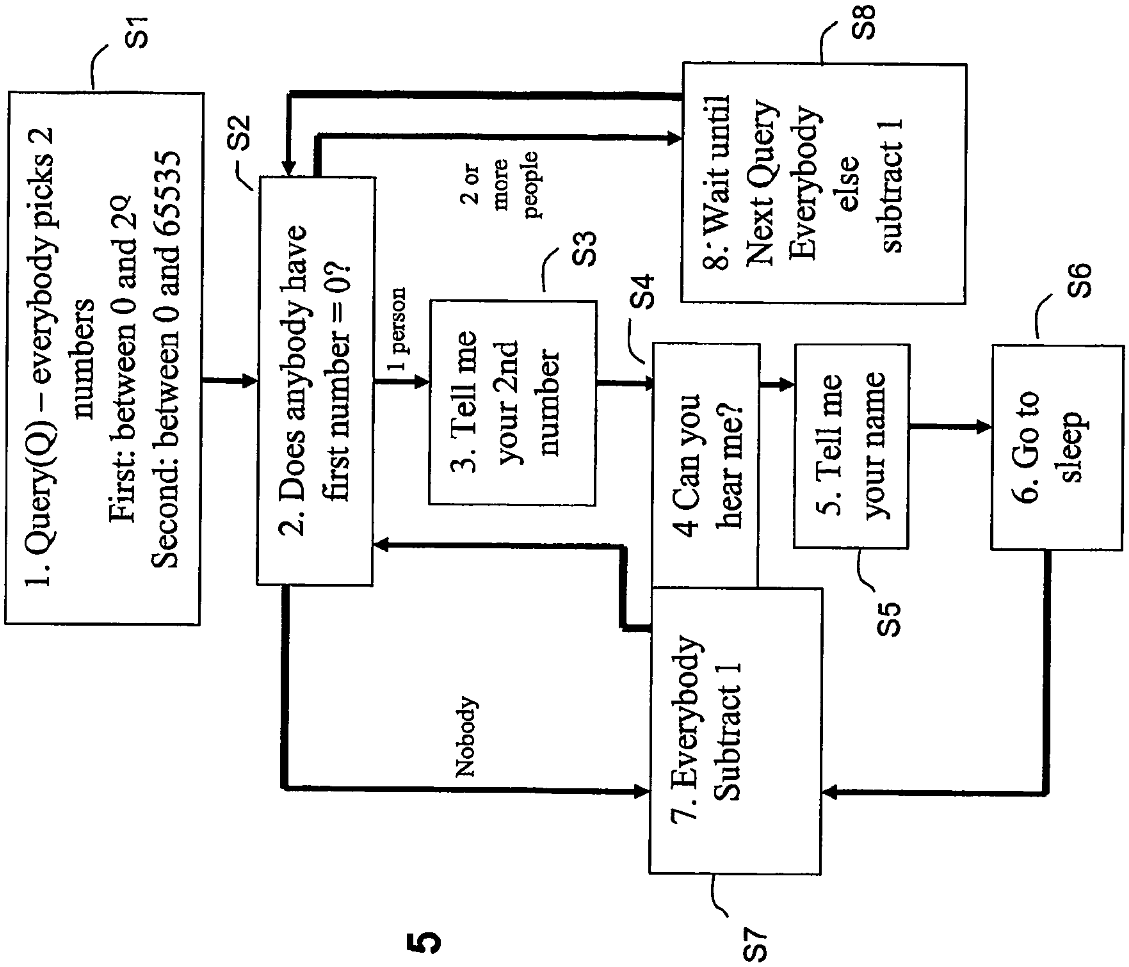
FIG. 5 is a flow chart showing the Q algorithm for tag singulation in EPCGlobal Gen2 RFID tags.

FIG. 5 shows a simplified version of the standard Q algorithm for tag singulation in EPCGlobal Gen2 RFID tags. This algorithm is used by an RFID reader/receiver to coordinate a set of tags so that it can cause each tag to transmit on its own and so can be read in turn by the reader. In the present case, the channels are time slots.

At step S1, the reader broadcasts a Query (Q) (which may be generated on a regular basis, e.g. once per minute, once every ten minutes, etc., depending on the environment and use to which the tags are being put). All the tags "wake up" in response and select an identity (ID) based on a number between 0 and $2^Q$.

The reader then sends a query to the tags with an ID of 0 in step S2. If there are no tags with IDs of 0 so that the reader fails to obtain a response ("silence"), then all tags reduce their ID by 1 in step S7 and steps S2 and S3 are iterated until a response is obtained. If more than one tag responds to the reader in step S2 (a "collision"), then in step S6 all these tags are ignored until the next query is generated. All tags with IDs greater then 0 then deduct 1 in step S7.

Figure 6:
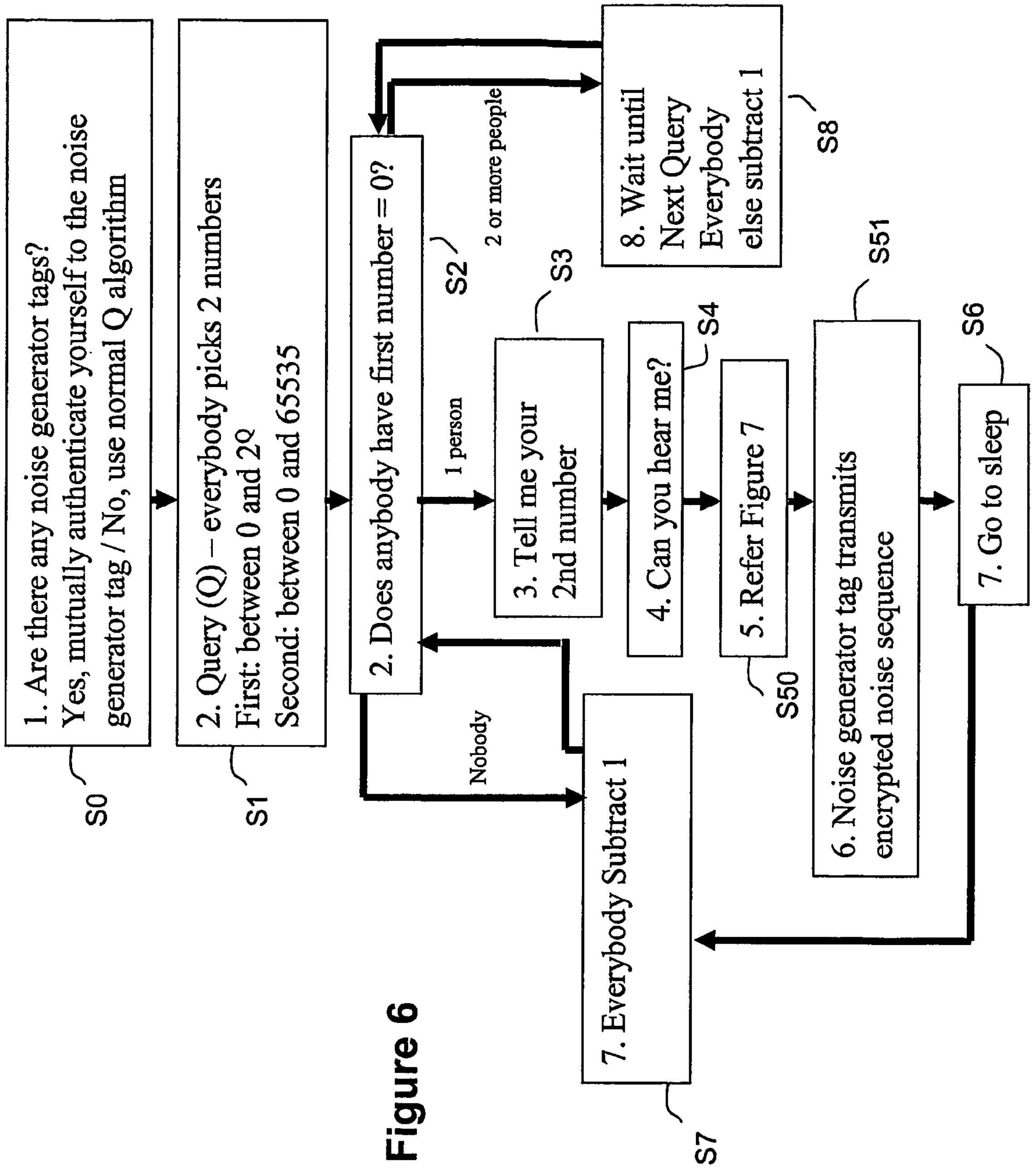
FIG. 6 is a flow chart showing a modified Q algorithm for tag singulatlon using an embodiment of the present invention.

If only one tag has an ID of 0 ("1 tag selected"), then it responds to the receiver in step S4. The transmitting tag and the receiver then can perform further communication; typically the tag will send its key information to the receiver. The transmitting tag then goes to sleep until the next query (step S5), and the other tags subtract 1 from their ID and repeat the process until all tags have been deferred, or identified to the receiver (step S7). FIG. 6 shows the Q algorithm of FIG. 5 which has been adjusted to allow for the securing process of an embodiment of the present invention. Where the steps of the algorithm are the same, identical numbering has been used, and these steps will not be explained further.

Three additional steps have been inserted into the algorithm of FIG. 5 to allow for the presence of a noise generator (or here assumed to be a similar RFID tag, and called a "noise generator tag").

Firstly, prior to the Query stage, the reader queries the neighbourhood for noise generator tags (step S0). The noise generator tag and the reader mutually authenticate themselves using the cryptographic authentication protocols. Accordingly, following authentication, the noise generator tag will share information regarding the noise signals with the reader.

Figure 7:
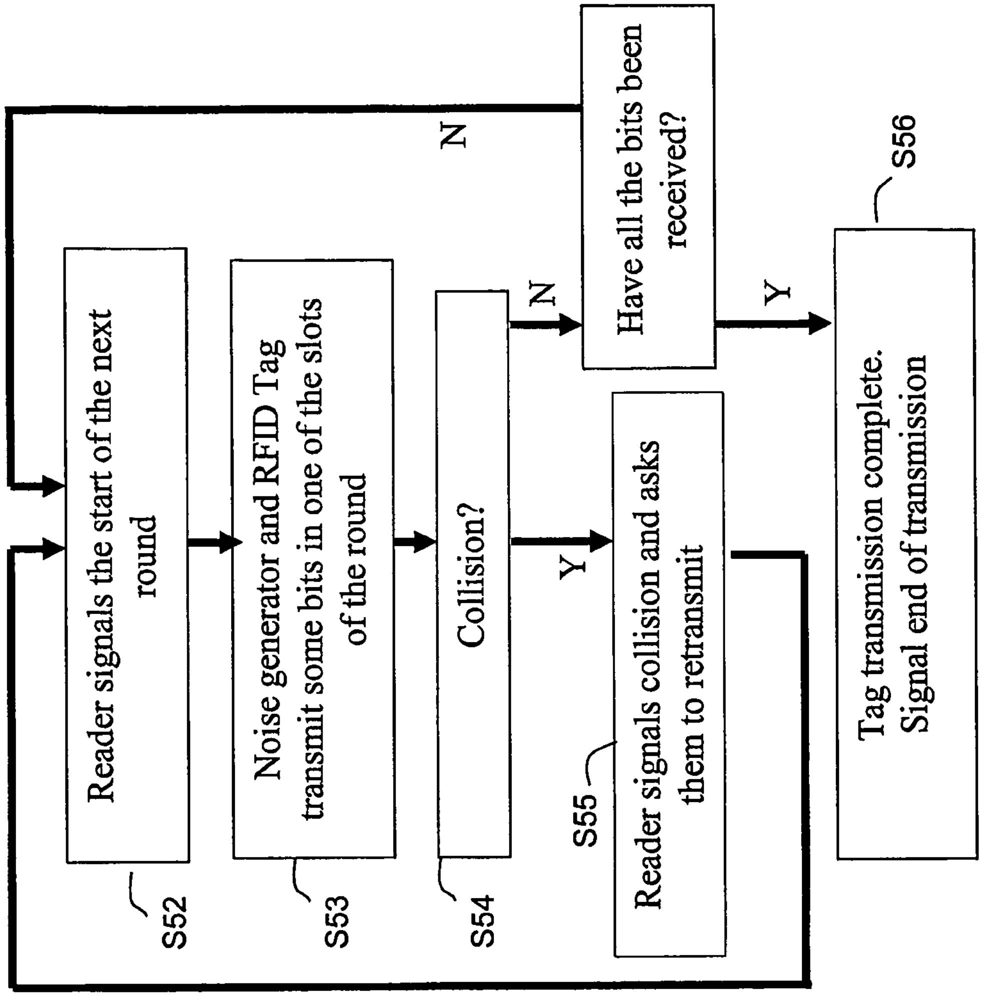
FIG. 7 is a flow chart showing another part of the modified Q algorithm for tag singulation using an embodiment of the present invention.

In the algorithm, once communication with a selected tag has been confirmed (step S40), the noise-secured transmission sequence shown in FIG. 7 is started.

The selected tag and the noise generator tag generate modified data using a modified slotted ALOHA (as described above). This sub-routine in step S40 replaces step S4 in the Q algorithm of FIG. 5, where the selected tag sends its information to the receiver. Instead, the selected tag transmits its information in competition with the noise generator tag for the channel. For the purposes of this example, we assume the only one selected RFID tag and one noise generator tag is active during this process.

In shown in FIG. 7, the reader initiates a round and determines the number of slots in a round (step S42). Both the noise generator and the selected tag transmit bits in selected time slots (communications channels) in step S43. The bit pattern transmitted by the noise generator tag is preferably indistinguishable from the bit pattern that would be transmitted by a selected tag.

The greater the number of slots in a round the lower are the probability of collisions for the slot. The probability of collisions during a round are given by 1/n where n is the number of slots in a round. The probability of transmitting a particular bit is given by 1/n where n is the number of slots in a round. For e.g. four slots in a round, the noise generator tag and the selected tag would decide with probability ¼ to transmit during a particular slot. The probability of colliding during a round is given by ¼.

This process would be repeated for n+m rounds until n RFID tag bits have been correctly received with m collisions.

The receiver detects whether there was any collision between the bits transmitted by the noise generator and selected tags (step S44). If a collision takes place, the reader would transmit a 'repeat' signal at the end of the round (step S45) asking the tag and noise generator tag to resend the last bit since a collision has occurred. Otherwise, it would transmit the 'next' signal telling them that the last bit has been correctly received and asking them to send the next bit (step S42), until the tag transmission is complete, at which point the end of the transmission is signalled to the other tags by the receiver (step S46) and the algorithm continues as set out in FIG. 6 (at step S41).

Although the above description refers to the transmission of single bits, groups of bits of any number (e.g. bytes, 16 bit words, etc.) could be transmitted in each slot.

Once the tag transmission is complete, the noise generator tag transmits to the receiver (which may be an internal link if the noise generator tag and the receiver are part of the same device) the sequence of noise bits (step S41) so that the receiver can determine the data that was sent from the selected tag. Of course, the noise generator tag may continuously pass the sequence of noise bits to the receiver in parallel with the transmissions, rather than waiting for the transmissions to finish.

In this way a third party or interloper who is not able to perform directional or signal analysis on the data cannot distinguish between data bits that come from the selected tag and those produced by the noise generator tag, and so security for the data transmitted by the tag is achieved.

A further example of an implementation of embodiments of the present invention is in an Ethernet.

In this example a first computer is connected to a router over an Ethernet segment which is for some reason considered insecure. The Ethernet link can be protected without modification of the first computer by arranging for the router to transmit "noise" frames whenever the computer is trying to transmit. To do this, the router inserts sensible but meaningless frames onto the Ethernet, which carry the MAC of the first computer as the sender, and the MAC of the router as the receiver, and hence are indistinguishable by a third party or interloper from the true frames sent by the first computer.

The above example can, of course, be scaled to a larger number of first computers connected to the segment, in which case the router would insert frames corresponding to those computers as well. Also, the "noise" frames could be inserted onto the Ethernet by a device which is separate from the router, but which has a secure connection to it.

Whilst the present invention has been exemplified in relation to the above embodiments, these are not to be considered limiting, and it will be appreciated that further variations and modifications of the above embodiments are possible within the scope of the present invention.

What is claimed is:

1. An RFID tag reading system including a first transmitter, and a tag reader including a receiver, wherein:

the first transmitter transmits noise signals across a range of communication channels used by the receiver of the tag reader and sends to the receiver information about the noise signals over a communication channel different from said range of communication channels, the receiver of the tag reader is adapted to receive a message transmission by an RFID tag being read by the reader, the message transmission being transmitted over one or more of said range of communication channels, and to distinguish the message from the noise signal using the information from the first transmitter about the noise signals.

2. An RFID tag reading system according to claim 1 wherein the receiver and first transmitter are both part of the tag reader.

3. An RFID tag reading system according to claim 1 wherein the content of the noise signals is substantially identical to the content of the message.

4. An RFID tag reading system according to claim 1 wherein the range of communication channels includes one or more of: different time slots; different frequency bands; different orthogonal codes.

5. An RFID tag reading system according to claim 1, further including said RFID tag, the RFID tag transmitting over one or more of said communication channels.

6. An RFID tag reading system according to claim 5 including a plurality of RFID tags.

7. An RFID tag reading system according to claim 5 wherein the RFID tag is a simple device.

8. A communications system according to claim 5 wherein the RFID tag is a device capable only of transmitting its own identity over a communication channel.

9. An RFID tag reading system according to claim 5 wherein the RFID tag is incapable of encrypting transmissions.

10. An RFID tag reading system according to claim 1 wherein the receiver, the RFID tag or both are adapted to detect when a collision occurs on a particular channel, and retransmit the data lost in that collision.

11. A method of securing communications between an RFID tag and an RFID tag reader, the method including:

transmitting a message from the RFID tag over one or more of a range of communication channels;

transmitting noise from a transmitter over said range of communications channels;

passing to a receiver of the RFID tag reader information about the noise from the transmitter, the information about the noise being passed to the receiver over a communication channel different from said range of communication channels;

receiving the transmitted message and the transmitted noise at the receiver of the RFID tag reader; and using the information about the noise from the transmitter to retrieve the message by distinguishing the message from the noise in the received transmission.

12. A method according to claim 11 wherein the step of retrieving includes receiving a combination of the transmitted message and the transmitted noise in the receiver, and separating the transmitted message from that combination using said information.

13. A method according to claim 11 wherein the step of retrieving includes selectively receiving on only a portion of said range of communications channels, so as to only receive the message, said portion being determined using said information.

14. A method according to claim 11 wherein the transmitter and the receiver are part of the RFID tag reader.

15. A method according to claim 11 wherein the content of the noise is substantially identical to the transmissions made by the RFID tag.

16. A method according to claim 11 wherein the range of communication channels includes one or more of: different time slots; different frequency bands; different orthogonal codes.

17. A method according to claim 11 further including the step of detecting when a collision occurs between a part of the message transmitted by the RFID tag and the noise bits transmitted by the second transmitter, and retransmitting the part of the message affected.

18. An RFID tag reading system comprising:

a processing system, comprising at least one computer processor, the processing system being configured to:

receive information from a first transmitter about noise bits transmitted by the first transmitter across a range of communication channels used by a tag reader of the tag reading system, the information about the noise bits being received using communication channel different from the range of communications channels;

receive a transmission comprising message bits transmitted by an RFID tag over one or more of said range of communication channels, the message bits of the transmission being interleaved with the noise bits; and distinguish the message bits from the noise bits using the information from the first transmitter about the noise bits.

19. The RFID tag reading system according to claim 18 wherein the tag reader and the first transmitter are components of the same device.

20. The RFID tag reading system according to claim 18 wherein the content of the noise bits are substantially identical to the transmissions made by the RFID tag.

21. The receiving system according to claim 18 wherein the range of communication channels at least includes different time slots.

22. The receiving system according to claim 18 wherein the range of communication channels at least includes different frequency bands.

23. The receiving system according to claim 18 wherein the range of communication channels at least includes different orthogonal codes.

24. The receiving system according to claim 21 wherein the message bits are transmitted over said different time slots, which are randomly chosen.

25. The receiving system according to claim 22 wherein the message bits are transmitted over said different frequency bands, which are randomly chosen.

* * * * *